Nov. 22, 1932.   J. W. WILLIAMS   1,888,416
GAUGE
Filed March 14, 1929
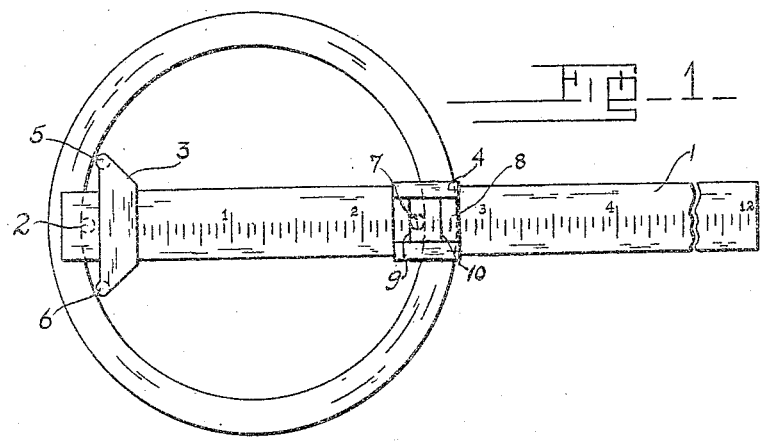
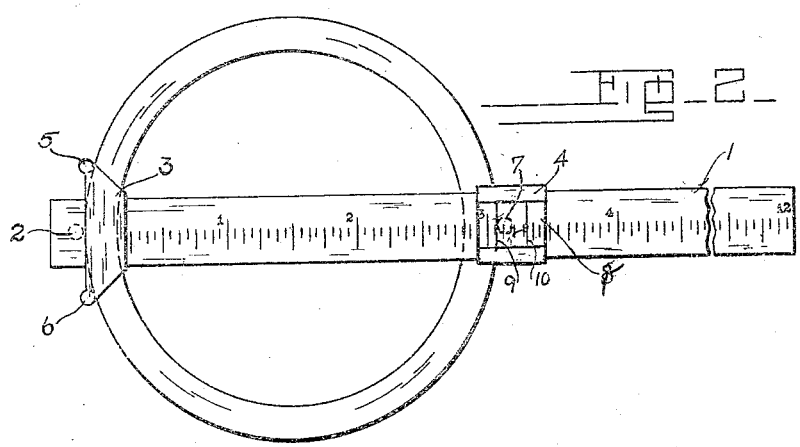
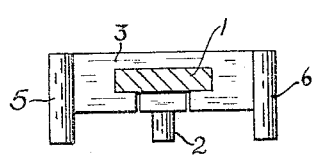
Inventor
John W. Williams
By
Attorney Patented Nov. 22, 1932

1,888,416

UNITED STATES PATENT OFFICE

JOHN W. WILLIAMS, OF THE UNITED STATES ARMY, TAMPA, FLORIDA

GAUGE

Application filed March 14, 1929. Serial No. 347,109.

(GRANTED UNDER THE ACT OF MARCH 3, 1883, AS AMENDED APRIL 30, 1928; 370 O. G. 757)

This invention described herein may be manufactured and used by or for the Government for governmental purposes, without the payment to me of any royalty thereon.

Briefly stated the invention is a gauge for determining the diameter of articles having a circular configuration, for example: cylinders or pistons, the instrument being so constructed as to be particularly adapted to scale an inside measurement, as the internal diameter of a cylinder, or an outside measurement, for instance, the external diameter of a piston.

The device comprises a limb, graduated in linear units, provided with a slide having two hair lines thereon for reading the limb and also provided with a runner furnished with two studs. A fixed stud on one end of the limb co-operates with the two studs on the runner and an additional stud on the slide to position the instrument relatively to the object to be gauged.

One object of the invention is to provide an instrument for accurately gauging, either internally or externally, circular articles.

A further object is to provide a gauge that is simple in construction and "fool proof" in its operation.

Still another object is to furnish an instrument that is very accurate and dependable.

In order that this invention may be readily understood, reference is had to the accompanying drawing, forming a part of this specification and in which—

Fig. 1 illustrates the gauge applied to a circular article to measure, for instance: an internal diameter, Fig. 2 depicts the instrument in position for determining, for example: the external diameter of an article, Fig. 3 is an end elevation of the runner, and Fig. 4 is an end elevation of the slide.

A limb (1) having a stud (2) near one end is graduated in linear units beginning at the inside edge (the right edge as viewed on Fig. 1) of the stud and progressing along the limb. The limb carries a runner (3) and a slide (4), both slidable upon the limb but developing sufficient friction between themselves and the limb to preclude their free movement whereby, when placed in a certain position, some effort is required to move them. The runner carries two studs (5) and (6) positioned at opposite extremities thereof and adapted to be brought into contact with the periphery of the circle whose diameter is to be measured. The slide carries a stud (7) centrally thereof near that edge nearest the runner, the stud being also designed to be moved into contact with the periphery of the circle being gauged.

The slide is furnished with a transparent cover-plate (8) having two hair lines delineated thereon whereby the scale on the limb is read, one line (10) indicating the true reading when the instrument is utilized for internal measurements (Fig. 1) and the other line (9) for reading external measurements (Fig. 2) as will more clearly appear hereinafter.

The operation of the device is as follows: Stud (2) is butted against the periphery of the circle to be gauged after which runner (3) is moved until studs (5) and (6) also contact with the same periphery. This disposition of the three studs (2), (5) and (6) centers the limb with respect to the circle whereupon stud (7) must be diametrically opposed to stud (2). Now if slide (4) is moved so as to bring stud (7) into contact with the periphery of the circle being gauged, one or the other of the hair lines will indicate the diameter depending on whether the adjustment was made internally as in Fig. 1 or externally as in Fig. 2.

Lines (9) and (10) are spaced apart a distance equal to the combined diameter of studs 2 and 7 (both of which are the same) to provide for the displacement of the scale on the limb and the slide measuring position which is necessitated in adjusting the studs (2) and (7) from contact with the internal periphery to contact with the external periphery of a circle to be measured. That such is true can be readily understood if it is desired to gauge both internally and externally an assumed circle having no thickness. In such a measurement both internal and external disposition of the instrument to the circle should give the same reading but to obtain similar readings two hair lines are indispensable as the studs (2) and (7) have finite proportions. If studs (2) and (7) were infinitely small one hair line would suffice for indicating the reading no matter whether the adjustments be external or internal.

It is to be understood that the above described constructions are only exemplary and may be replaced by mechanical equivalents without departing from the scope of the invention.

Having described my invention what I claim as new and wish to protect by Letters Patent is:

1. In a circle gauge, an elongated limb having flat upper and lower surfaces, a graduated scale marked on the upper surface thereof and a gauge stud mounted on the lower surface, the center line of said gauge stud lying beyond the scale with the longitudinal extremity of said gauge stud registering with the zero marking thereon, a slide having flat upper and lower surfaces, the upper surface being transparent, a second gauge stud mounted on the lower surface of said slide, hair-lines normal to the aforesaid scale marked on the upper transparent surface thereof and spaced at a longitudinal distance equal to the sum of the longitudinal breadth of the two gauge studs, the longitudinal extremity of the second gauge stud nearest the zero marking of the limb registering with the corresponding hair-line, a runner slidably mounted on said limb having flat upper and lower surfaces, and two centering studs mounted on the lower surface of said runner equi-distant from the longitudinal center line thereof, substantially as set forth.

2. In a circle gauge, an elongated limb having two flat surfaces, a graduated scale marked on one surface thereof and a gauge stud depending from the opposite surface, the center line of said gauge stud positioned beyond the zero marking of said scale and the lateral extremity of said stud located directly beneath said zero marking, a longitudinally movable slide mounted on said limb, comprising a transparent surface lying adjacent said scale and an under surface spaced from said transparent surface sufficiently to permit the sliding movement of the limb between said surfaces, hair-lines marked upon said transparent surface, a second gauge stud depending from said under surface and positioned between said hair-lines with the longitudinal extremity of said stud nearest the zero marking located directly beneath the hair-line nearest said zero marking, and a runner slidably mounted upon said limb and centering studs mounted upon said runner equally spaced from the center line thereof.

3. In a circle gauge, an elongated limb having flat upper and lower surfaces, a graduated scale marked on the upper surface thereof and a circular gauge stud mounted on the lower surface, the center line of said circular gauge stud lying beyond the scale with the longitudinal extremity of said stud registering with the zero marking thereon, a slide having flat upper and lower surfaces, the upper surface being transparent, a second circular gauge stud of equal diameter as the first mounted on the lower surface of the slide, hair-lines normal to the aforesaid scale marked on the upper transparent surface thereof and spaced at a longitudinal distance equal to twice the diameter of a gauge stud, the longitudinal extremity of the second gauge stud nearest the zero marking of the scale registering with the corresponding hair-line, a runner slidably mounted on said limb having flat upper and lower surfaces, and two centering studs mounted on the lower surface of said runner equi-distant from the longitudinal center line of said limb, substantially as set forth.

JOHN W. WILLIAMS.